UNITED STATES PATENT OFFICE.

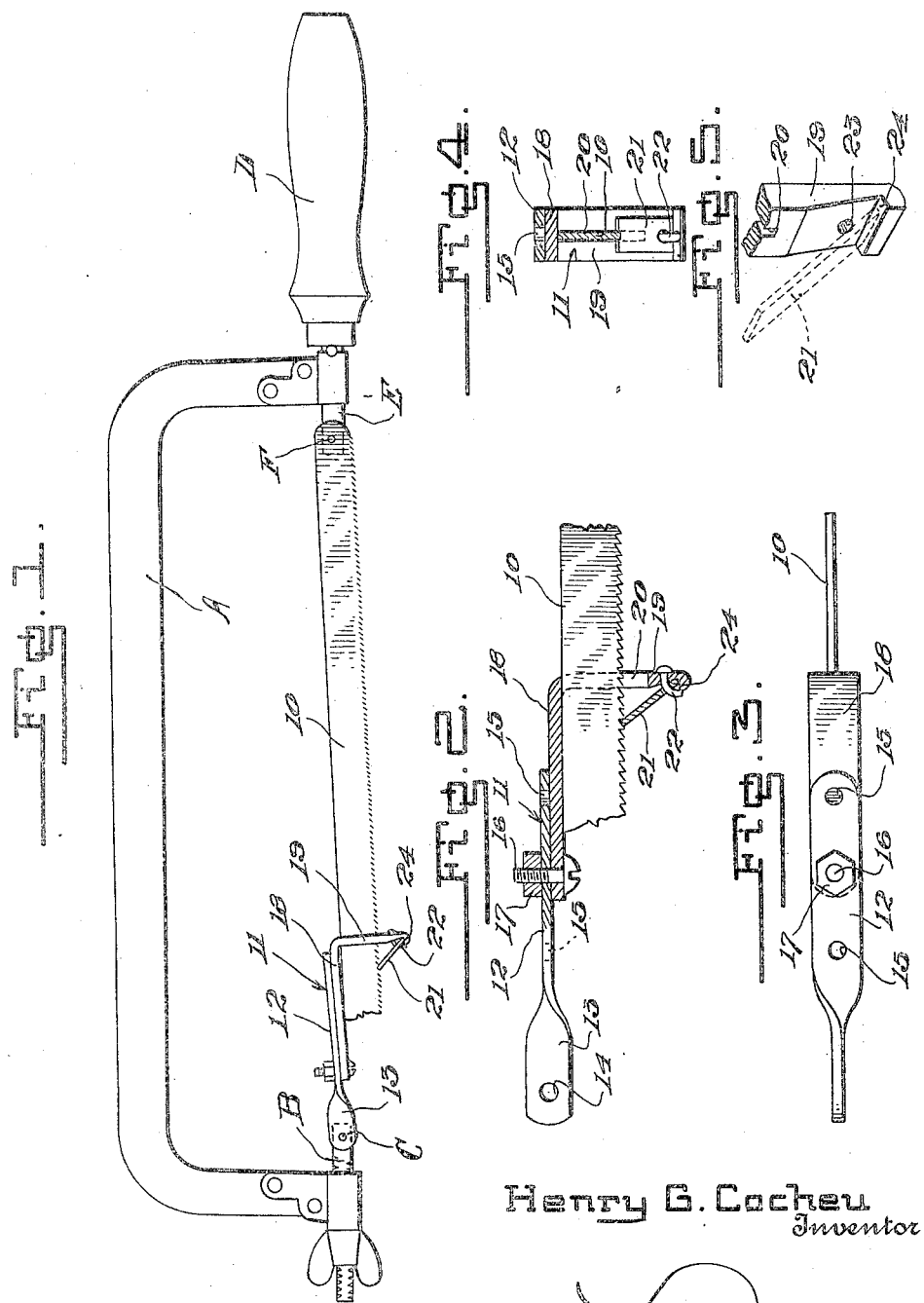

HENRY G. COCHEU, OF NEW YORK, N. Y.

HOLDER FOR HACKSAW-BLADES.

1,374,822.   Specification of Letters Patent.   Patented Apr. 12, 1921.

Application filed August 26, 1919. Serial No. 319,930.

*To all whom it may concern:*

Be it known that I, HENRY G. COCHEU, a citizen of the United States, residing at New York, in the county of New York and State of New York, have invented certain new and useful Improvements in Holders for Hacksaw-Blades, of which the following is a specification.

This invention relates to a holder for saw blades, particularly designed for the use in connection with the removable blades of hack or analogous saws, and more particularly for non-adjustable hack saw frames. When a blade becomes broken it is thrown away. Therefore the object of this invention is to provide a holder for the broken blade of hack or analogous saws which may be easily and quickly connected to the front or handle end of the hack saw frame for engaging and securely connecting a broken or short hack saw blade in the frame, and which device is adjustable as to its operative length, permitting regulation of its length to accommodate the length of the broken saw blade or permit it to be properly attached to the front or handled end of the saw frame.

A further object of this invention is to provide a saw blade holder as specified which is simple in construction and may be manufactured at a relatively low cost, as well as one which is adjustable for attachment to saw blades of different width within certain limits as well as to obviate the expense and inconvenience of purchasing a new saw blade when same might be most needed.

Other objects of this present invention will appear in the following detailed description taken in connection with the accompanying drawing, forming a part of this specification, and in which drawing:

Figure 1 is a side elevation illustrating an ordinary hack saw frame, and showing the improved blade holder connected thereto.

Fig. 2 is a longitudinal section through the improved blade holder showing it connected to a saw blade.

Fig. 3 is a plan view of the blade holder.

Fig. 4 is a vertical section through the blade holder, and

Fig. 5 is a detail perspective view of a part of the blade holder structure.

Referring more particularly to the drawing, wherein like characters indicate like and corresponding parts throughout the several views there is shown the usual approved type of hack saw frame A, which carries the tension bar B, which carries the pin C for insertion through the blade 10, at the end of the back of the saw structure remote from the hand grip D thereof, and also embodies the usual stem E extending inwardly from the hand grip D which carries the pin F also for engagement through one of the openings in one end of the saw blade 10. In the drawings, the saw blade 10 is illustrated as having one end broken therefrom, which quite frequently occurs during the use of hack saws. However, it is to be understood that this improved attachment may be employed for attachment to saw blades, which are too short to reach from the pin F to the pin C if so desired.

This attachment 11 comprises an attaching bar 12 one end of which is twisted to be positioned at right angles to the main body of the attaching bar 12. This twisted end 13 is provided with an opening 14 adapted to receive the pin C therethrough for connecting the attachment 11 to the tension bar B having a winged nut thereon. The bar 12 is provided with a plurality of longitudinally spaced openings 15, any one of which is adapted to receive the bolt 16 therethrough, by means of which bolt and a nut 17, the bar 12 is connected to the blade carrying angled bar 18. This blade carrying angled bar 18 has one end downturned as shown at 19, and this downturned end 19 is provided with a slot 20 which receives therethrough the saw blade 10. When the saw blade is inserted through the slot 20, the upper edge of the blade which is free from saw teeth, engages the under surface of the flat or horizontal portion of the bar 18, and one of the teeth of the saw blades 10 is engaged, on its angled side, by a locking dog 21, which is connected to the lower end of the angled or downturned end 19, by means of a pin 22, which is inserted through a suitable opening 23, formed in the downturned end 19, and is bent arcuately as clearly shown in Fig. 2 of the drawings, to engage through a suitable opening in the locking dog 21, and to engage the outer surface of the lower end of the downturned angled end 19, to securely connect the locking plate 21 to the downturned end 19 in such manner as to permit pivotal movement of the locking plate. The downturned end 19 has its outer face cut away, as clearly shown in Figs. 2 and 5 of the drawings, forming a shoulder 24, upon which the dog 21 rests. The dog 21 is provided for engagement against one of the teeth of the saw blade 10 for clamping the saw blade in engagement with the under surface of the horizontal portion of the bar 18 and holding the saw blade securely connected to the saw frame A during sawing operation thereof, after giving the necessary tension to blade by screwing up the winged nut on bar B.

From the foregoing description taken in connection with the accompanying drawings, it will be readily apparent that a saw blade holder for hack saw frames, of the non-adjustable type has been provided, which will permit attachment of various lengths of saw blades to the said frame, through the medium of its adjustability provided by the connection between the plates 12 and 18. However, the attachment will be equally effective in operation, when attached to the adjustable type of hack saw frames.

The improved saw blade holder herein described may be used on either end of a saw frame, or on both ends at the same time in case the blade is broken at both ends or is too short to be used with only one holder.

Changes in details may be made without departing from the spirit of this invention, but;

I claim:

1. The combination with a saw frame including an adjustable member having an attaching pin, of a saw blade holder including, a body having an attaching portion arranged to detachably engage said pin and a relatively long flat carrying portion arranged at right angles to the attaching portion, a saw blade carrying bar adjustably connected to the carrying portion and provided with a right angular downturned slotted end arranged at right angles to the saw blade for slidably receiving the saw blade, and a pivoted dog carried by the free end of said downturned end and arranged to project upwardly therefrom for engagement with the teeth of a saw.

2. In a saw blade holder, an attaching and saw blade carrying member formed from a single strip of metal including a body and a right angularly bent foot, the foot having a longitudinally extending saw blade receiving slot, and a pivoted dog carried by the lower end of the foot for engaging the saw teeth and for forcing the smooth edge of the saw blade into intimate engagement with the body.

3. In a saw blade holder, a saw blade carrying member including a body, an angularly extending foot formed on the body, the foot having a longitudinally extending centrally disposed slot formed therein for the reception of a saw blade, said foot being provided with a transversely extending cut out portion in one face thereof near its lower end forming a ledge, a pin inserted through the lower end of the foot, a clamping dog pivotally mounted upon said pin for movement toward and away from the foot and adapted for engagement with a saw tooth to force the saw blade into engagement with a portion of the outer face of said body, the ledge forming a seat for the outer end of said dog.

HENRY G. COCHEU.